US006040639A

United States Patent [19]

Ginell et al.

[11] Patent Number: 6,040,639

[45] Date of Patent: Mar. 21, 2000

[54] CIRCUIT FOR IMPROVED LOAD TRANSIENT RESPONSE IN POWER SUPPLIES

[75] Inventors: Thomas Ginell, Hagersten; Lars Thorsell, Upplands-Vasby; Per Lindman, Djursholm, all of Sweden

[73] Assignee: Telefonaktiebolaget LM Ericsson, Stockholm, Sweden

[21] Appl. No.: 08/536,098

[22] Filed: Sep. 29, 1995

[51] Int. Cl.$^{7}$ .................................................... H02J 1/10

[52] U.S. Cl. ................................ 307/44; 307/69; 307/86

[58] Field of Search ................................ 307/43, 44, 45, 307/46, 47, 48, 49, 50, 64, 66, 85, 86, 87

[56] References Cited

U.S. PATENT DOCUMENTS

| | | | |
|---|---|---|---|
| 3,048,718 | 8/1962 | Starzec et al. | 307/93 |
| 3,400,325 | 9/1968 | Webb | 323/19 |
| 4,074,182 | 2/1978 | Weischedel . | |
| 4,210,958 | 7/1980 | Ikenoue et al. | 363/124 |
| 4,262,209 | 4/1981 | Berner | 290/7 |
| 4,318,007 | 3/1982 | Rizzi | 307/44 |
| 4,441,070 | 4/1984 | Davies et al. | 323/268 |
| 4,622,629 | 11/1986 | Glennon | 363/70 |
| 4,633,412 | 12/1986 | Ebert, Jr. et al. | 364/493 |
| 4,717,833 | 1/1988 | Small | 307/44 |
| 4,779,037 | 10/1988 | LoCascio | 323/275 |
| 4,812,672 | 3/1989 | Cowan et al. | 307/64 |
| 4,849,845 | 7/1989 | Schmitt | 361/56 |
| 5,023,746 | 6/1991 | Epstein | 361/56 |
| 5,200,692 | 4/1993 | Krinsky et al. . | |
| 5,289,364 | 2/1994 | Sakurai | 363/147 |
| 5,408,172 | 4/1995 | Tanimoto et al. | 323/273 |
| 5,428,524 | 6/1995 | Massie | 363/79 |

FOREIGN PATENT DOCUMENTS 42 03 829 8/1993 Germany .

*Primary Examiner*—Jeffrey Gaffin
*Assistant Examiner*—Peter Zura
*Attorney, Agent, or Firm*—Burns, Doane, Swecker & Mathis, L.L.P.

[57] ABSTRACT

An apparatus contains a main electrical supply and an additional electrical supply for supplying additional electrical current in response to a change in an output load supplied by the main electrical supply. A differential measuring device senses a change in the load, or output of the main supply, and provides an indication to the additional electrical supply to supply additional current to the load. The additional electric supply contains a capacitor connected to a voltage source having a higher voltage output than the main electrical supply, and a current generator.

11 Claims, 2 Drawing Sheets

CIRCUIT FOR IMPROVED LOAD TRANSIENT RESPONSE IN POWER SUPPLIES

BACKGROUND

Applicants' invention relates to circuits for improving the transient response of an electric power supply, and in particular to a circuit having a higher-than-desired voltage output from which a current is sourced to suppress the transient during a voltage drop on a main output.

An important consideration in electric power supply design for circuits and systems having fast and large amplitude load changes is the voltage deviation when the power supply output current changes rapidly. Frequently, the design of the supply's output filter makes it difficult for the output current to respond quickly enough. The reason for this is that the output ripple must be kept low, which is inconsistent with a fast load transient response.

One way to improve the transient response is to increase the supply's switching frequency, reduce the output filters, and increase the bandwidth of the feedback loop. Nevertheless, the performance achievable by this technique is not enough to meet the requirements of recently developed computer architectures and other uses, in which active power management and clock rate control results in huge power changes in a few microseconds. The output voltage must still be maintained within a narrow tolerance band.

For example, the model PKU4110PI is a 100-watt converter that is commercially available from Ericsson Components AB. A 25-ampere (25-A) load current change having a rise time less than ten microseconds (10 $\mu$s) produces a drop of more than 200 millivolts (mV) on the output of the PKU4110PI. Although this is a transient response which is excellent, it is still not good enough for some demanding applications. It is no longer uncommon to require a voltage drop of less than 50 mV for such a load transient.

One way to improve transient response performance that has been tried is the use of an additional output. U.S. Pat. No. 4,074,182 to Weischedel describes a d.c. power supply that comprises two voltage regulators connected in parallel to a common load. One of the regulators is a spare that supplies the load automatically if the output of the other regulator decreases. This arrangement purportedly can minimize load transients.

U.S. Pat. No. 4,622,629 to Glennon describes a power supply that has a first rectifier and a supplemental rectifier, which supplies power when the first rectifier's output drops.

U.S. Pat. No. 5,408,172 to Tanimoto et al. describes a power supply having a driving circuit that is turned on when the current demanded by a load increases and causes a drop in the load's power supply voltage.

These previous methods and circuits have not successfully addressed all of the problems and have not provided all of the desirable features.

SUMMARY

Applicants' invention remedies these and other deficiencies of prior apparatus and methods. In accordance with one aspect of the invention, there is provided an apparatus that supplies additional electrical output to a main electrical supply that is supplying current to a load. The additional electrical output is provided in response to a change in the output of the main electrical supply. A filter measures a change in output of the main electric supply and provides an output to a differential amplifier, which in response controls the supply of additional electrical output.

BRIEF DESCRIPTION OF THE DRAWINGS

The features and advantages of Applicants' invention will be understood by reading this description in conjunction with the drawings, in which.

DETAILED DESCRIPTION

In accordance with Applicants' invention, the output performance of a power supply is improved by providing an additional output with a higher voltage, from which a current is sourced during a voltage drop on the main output. Such an arrangement is illustrated by the generalized block diagram of FIG. 1.

A power supply in accordance with Applicants' invention comprises a main voltage source $V_{main}$ 10, a low-pass reference filter 14, an error amplifier 16, and an additional current source. As indicated in FIG. 1, the additional current source may comprise an additional voltage source $V_{ad}$ 11, a means for storing electric charge such as a bulk capacitor 12, and a current generator 13 that supplies a current having a magnitude I that varies as a function of a differential error signal E provided to the error amplifier 16.

Figure 1:
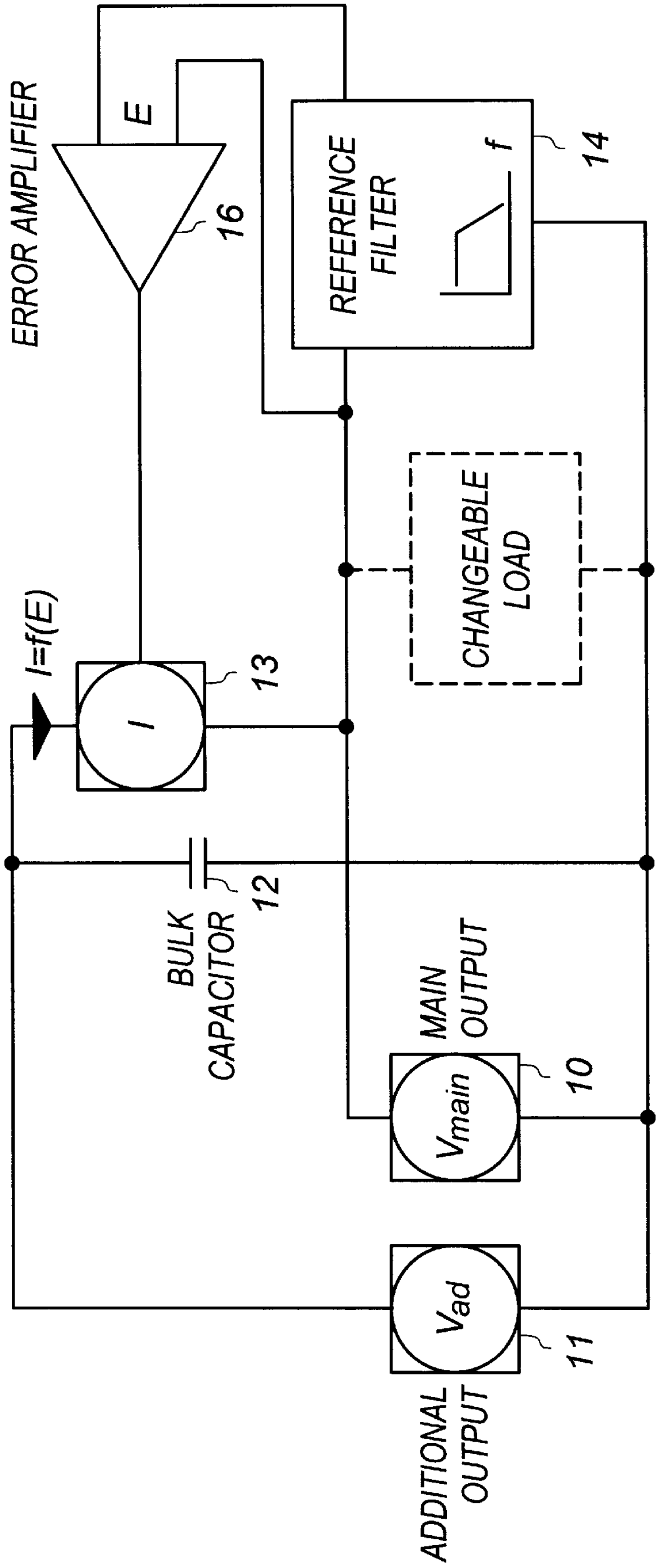
FIG. 1 is a generalized block diagram of a power supply in accordance with Applicants' invention.

The low-pass reference filter 14 is used as a device for differentially measuring the drop in output voltage of the voltage source $V_{main}$ 10 that arises from a change in load current that is indicated in FIG. 1 by the dashed block labeled Changeable Load. This is an important function. The differential measurement device must operate such that an output change of only a few tens of millivolts/volt must cause the variable current source to respond, if high performance is to be obtained. If an absolute measurement reference were to be used, it would have to be very stable and accurate. Moreover, an absolute reference increases the risks of sourcing current by mistake or sourcing current only in response to too great a voltage drop. As indicated in FIG. 1, the reference filter 14 is preferably an RC filter, which has the advantage of damping, thereby minimizing the risk of oscillation.

For a power supply having a voltage source $V_{main}$ 10 that produces a 3.3 V main output, the current source can be a conventional, current-limited 12-V power supply that stores energy in a device such as a bulk capacitor. When a voltage difference between the main output and the reference filter output is detected, the required current is sourced from the bulk capacitor, preventing a voltage decrease on the main output. The amount of current sourced is controlled by a suitable valve, such as a MOSFET in active operation.

A differential amplifier between the reference filter and the main output permits an offset to occur before activating the current source for two reasons. If it were otherwise, the normal ripple on the main output might activate the current source. Also, a voltage drop is typically used to cause the converter to increase the output current. It will be understood, however, that the need for an increase in load current can be indicated to the converter control circuitry in a wide variety of other ways, making a voltage drop unnecessary for increasing the output current of the converter. If a voltage drop is used and is small, the recovery time of the converter is extended and a larger amount of charge is delivered by the current source. When the converter has recovered and the supply's output current equals the demanded load current, then the bulk capacitor is charged in preparation for the next drop in main output voltage.

A power supply that includes a higher voltage supply for sourcing current in accordance with Applicants' invention has several major advantages. The voltage across the bulk capacitor can be allowed to drop until the capacitor cannot source any more current. The drop is determined by the recovery time and the amplitude of the current change. The delivered charge Q is proportional to the voltage drop U and the capacitance C of the bulk capacitor according to the following expression:

$$Q=U\times C$$

If a capacitor directly connected on the main output were used to source the demanded current, the allowed voltage drop would be just a fraction of what would be allowed on the additional power supply's output.

The ratio in required capacitance is on the order of magnitude of one hundred, considering that the serial resistance of the capacitor on the main output causes a significant drop by itself, letting alone the voltage drop due to the discharge. Taking a load current change of 15 A as an example, the equivalent series resistance (ESR) of the current source must be less than two milliohms (2 mΩ) if an output voltage deviation of 50 mV is to be obtained, allowing 30 mV of the 50 mV deviation to be due to the ESR. This can be compared with an ESR on the order of at least 200 mΩ that is allowed for the additional 12-V source in accordance with Applicants' invention, in which case only one 200 microfarad ($\mu$F) capacitor can be used in the additional current source if the desired recovery time is 200 $\mu$s. More than one hundred 150-$\mu$F tantalum capacitors would probably be needed if the capacitors were directly connected on the main output 10 and the recovery time were to remain the same. Another advantage is that Applicants' solution can be used in combination with standard power supplies.

It is currently believed that a power supply that can handle these kind of load current changes but that does not include an additional current supply or current output for improving load transient response will suffer from various design disadvantages, such as more complex circuitry, lower power density, and higher cost.

The details of the design of the additional current source in Applicants' improved load transient response circuit are determined mainly by the recovery time of the power supply and the amplitude and frequency of the load current change.

The size of the bulk capacitor 12 is determined by the amplitude of the current change and the recovery time. If the current rise is assumed to be linear, then the required minimum amount of capacitance C is determined by the following formula:

$$C=I_c\times t_r/(2\times U_{dr})$$

where $I_c$ is the current rise; $t_r$ is the recovery time; $U_{add}$ is the voltage of the additional output 11; $U_{main}$ is the voltage of the main output 10; $U_{dr}$ is the maximum voltage drop allowed across the bulk capacitor 12. The division by two is due to the triangular shape (linear rise and fall) of the sourced current.

The energy that has to be restored to the bulk capacitor 12 after each load transient is determined by the amplitude of the load change and the recovery time. If $U_{dr}$ is assumed to be $U_{add}-U_{main}$ (ideal), then the restored energy $W_r$ is given by the following expression:

$$W_r=C\times(U^2_{add}-U_{2main})/2$$

The product of the frequency and restored energy $W_r$ is the mean output power. A higher voltage $U_{add}$ increases the output power and requires a smaller bulk capacitor 12.

The useful part $W_u$ of the energy $W_r$ is given by the following expression:

$$W_u=C\times[U_{main}\times(U_{add}-U_{main})]$$

and the efficiency η of the additional current source is given by the following expression:

$$\eta=2\times U_{main}/(U_{add}+U_{main})$$

It will be noted that increasing $U_{add}$ results in lower efficiency η, but on the other hand a smaller capacitor might be used. As the efficiency is low for the current source, there is an incentive to reduce the recovery time of the converter. This might be done by external influence, for example by adjusting the parameters of the current source circuit.

The output ripple from a standard converter often has the same order of magnitude as the requirement on the voltage drop in case of a load change. This may make it advantageous to reduce the ripple by using on the converter's main output external capacitors having low impedances at the switching frequency of the power converter. To reduce voltage variations due to load changes, a bulk capacitor can be used on the main output. It is currently believed to be unwise to use an LC filter to reduce ripple because the inductor increases the response time of the converter. Also, the differential amplifier that controls the current source may try to regulate on the ripple if the ripple is too great. If the ripple frequency is filtered in the current source control, then its response time will be increased and also the required charge.

It is also possible to decrease the transient response amplitude in case of a load decrease. The rise in voltage between the reference filter and the main output is detected in the same way as in the case with load increase. The required current is sinked to the return path by a current sink circuit, which may be an active device like a MOSFET. The current sink circuit preferably uses the reference filter for controlling and increasing the accuracy in clamping the voltage at a specific level. As a simpler alternative, the sink circuit may be a zener diode. It will be understood by those of skill in this art that sinking current is less complicated than sourcing current because no external voltage source having a particular power output is required.

Figure 2:
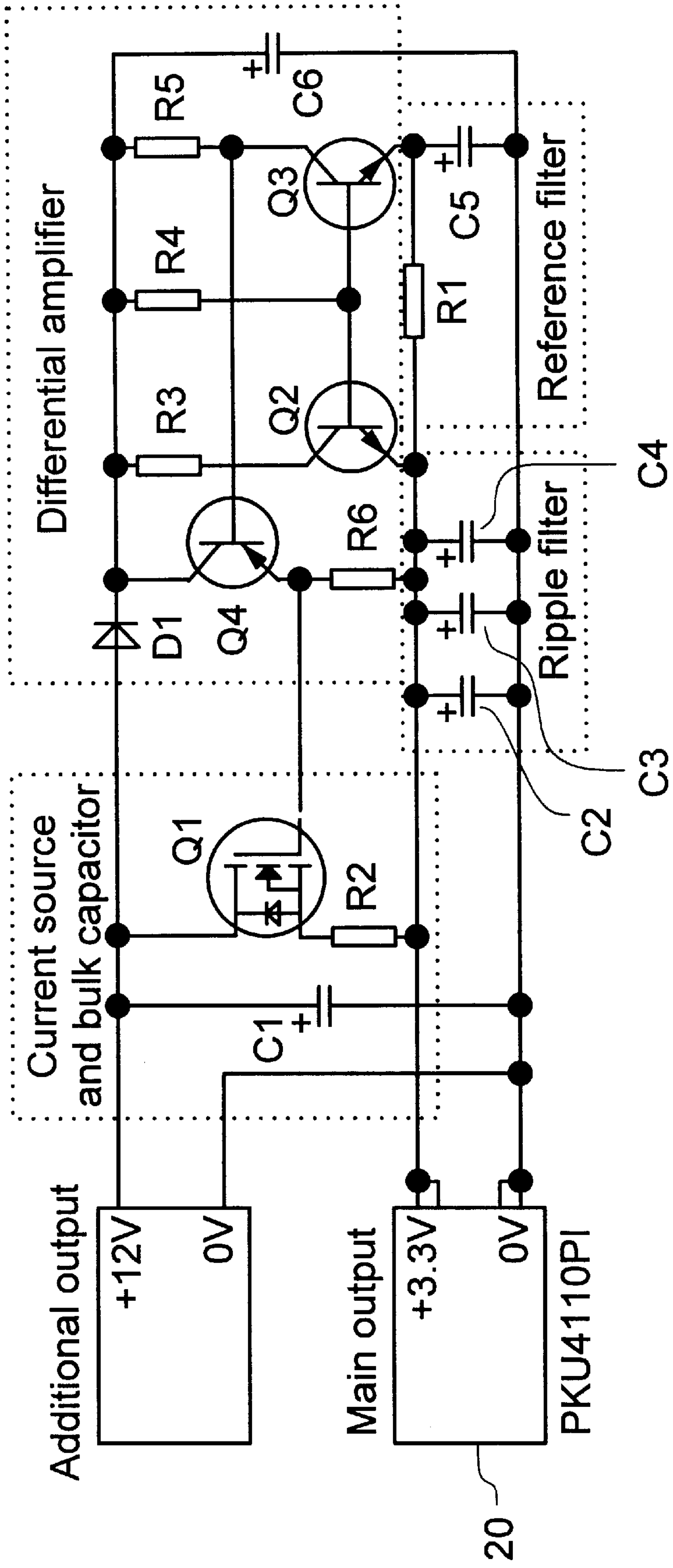
FIG. 2 is a block diagram of one embodiment of Applicants' invention.

FIG. 2 illustrates a circuit for improving the transient response of the model PKU4110PI described above. For a 25-A load change (e.g., for an output current swing from 5 A to 30 A), the transient response improves from 200 mV to 45 mV. Three 150-$\mu$F tantalum capacitors C2, C3, and C4 are connected on the main output 20 in both cases. The capacitors C2, C3, C4 reduce ripple on the main output, as described above, and also advantageously store energy.

Transistors Q2 and Q3 form a differential amplifier, and transistor Q1 operates as an emitter-follower. The circuit must respond quickly in raising the gate voltage on transistor Q1 from zero to a threshold voltage, but it is advisable to include the resistor R2, which reduces the gain. If resistor R2 is omitted, the gain may be too high and oscillation may occur; reducing the gain in another part of the circuit increases the time to reach the threshold voltage. It will be understood that the particular values of the components shown in FIG. 2 are application-dependent.

It will be understood that Applicants' invention is not limited to the particular embodiments that have been described and illustrated. This application contemplates any and all modifications that fall within the spirit and scope of Applicants' invention as defined by the following claims.

What is claimed is:

1. An electric power supply for a changeable load, comprising:

means for supplying an electric direct current to the changeable load;

additional means, operatively connected to the supplying means, for supplying additional electric direct current to the load in response to changes in the load; and means for sensing changes in an output voltage of the supplying means and for controlling the additional supplying means based on the sensed voltage changes;

wherein an output voltage of the additional supplying means is larger than the output voltage of the supplying means, and the supplying means, additional supplying means, and sensing means are connected in a closed loop.

2. The electric power supply claimed in claim 1, wherein the additional supplying means comprises a capacitor connected to a voltage source having a higher voltage than that of the supplying means, and a current generator connected between the voltage source and the supplying means.

3. The electric power supply claimed in claim 1, wherein the sensing means comprises means for differentially measuring a change in the output voltage of the supplying means and for controlling the additional supplying means.

4. The electric power supply claimed in claim 2, wherein a positive terminal of the capacitor is connected to a positive terminal of the voltage source.

5. The electric power supply claimed in claim 3, wherein the differential measuring means includes a filter which generates an indication signal in response to fast changes in the load.

6. The electric power supply claimed in claim 5, wherein the differential measuring means includes a differential amplifier connected to the filter, and the differential amplifier controls the additional supplying means in response to the indication signal.

7. The electric power supply claimed in claim 5, wherein the filter is a low-pass filter.

8. The electric power supply claimed in claim 6, wherein the differential amplifier is an error amplifier.

9. The electric power supply claimed in claim 5, wherein the indication signal is provided to the additional supplying means.

10. The electric power supply claimed in claim 5, wherein a ripple filter is connected between the supplying means and the differential measuring means.

11. The electric power supply claimed in claim 5, wherein the indication signal is provided to the current generator.

* * * * *